UNITED STATES PATENT OFFICE.

LOUIS CHARLES REESE, OF SAGINAW, MICHIGAN.

PROCESS OF EXTRACTING BRAN AND SIMILAR PRODUCTS.

1,331,125.   Specification of Letters Patent.   Patented Feb. 17, 1920.

No Drawing.   Application filed March 19, 1918. Serial No. 223,383.

*To all whom it may concern:*

Be it known that I, LOUIS CHARLES REESE, a resident of Saginaw, in the county of Saginaw and State of Michigan, have invented new and useful Improvements in Processes of Extracting Bran and Similar Products, of which the following is a specification.

This invention relates to the extraction of alimentary products from bran and similar materials by water and has for its object to make this operation more effective and less costly, and to produce a larger quantity, better quality and more advantageous chemical composition of the nutritious products obtainable thereby.

The woody fiber which these materials contain in considerable quantity, is completely indigestible, and, as it cannot be separated from the much larger quantity of nutritious matter which adheres to or is inclosed by the same, by mechanical means, as grinding, sifting and dusting, is the cause for the rejection as human food of the offal products of milling the cereals since the oldest times.

While the woody fiber is quite insoluble in water, a more or less considerable proportion of the nutritious ingredients of these raw materials dissolves when digested with water at a suitable temperature. The solution thus produced can be easily separated from the undissolved residue containing the woody fiber by straining or filtering the mash. This extract or the dry product obtained by its evaporation is then used alone or mixed with other alimentary articles for human food. Bran tea, a watery decoction of wheat bran, is a very old household remedy.

Wheat bran in which name I include all the other offal products of the milling process of wheat, has been studied the most and the object of many proposals and experiments to extract its valuable ingredients by water—distilled and well water—without and with the addition of chemical agents as common salt, sulfate of lime, phosphates, hydro chloric acid, etc. Its concentrated extract, as well as a dry powder produced by pulverizing the evaporated solution, have been produced on a commercial scale since more than 30 years and employed in a limited way in the manufacture of bread, biscuits, infants' and invalid foods, jellies and jams, non-intoxicating beverages, bread improvers etc.

All the processes used hitherto for producing these extracts do not fully exhaust the raw materials of their valuable alimentary contents, which to do is the main aim of my improved process, and in which it completely succeeds.

I found that in general these raw-products yield to water at a suitable tempera ture below its boiling point, usually at 40 to 70° C., a considerable proportion of their soluble components, then, after being exhausted thereby, to boiling water under atmospheric pressure another, but smaller portion, and thereafter to water boiling under higher than atmospheric pressure, 1½ to 2 atmospheres, still another smaller amount, all the three extracts representing sound food products.

According to my invention, I extract the raw materials to be treated in the well-known, continuously working battery of extractors, (as for instance used in sugar factories,) first at a suitable temperature below the boiling point of water 55–70° C., then at the boiling point of water under atmospheric pressure, 100° C., and finally above atmospheric pressure, under 1½ to 2 atmospheres at about 110–120° C.

For the last step—boiling under pressure—I use plain—preferably distilled—water as medium for extracting the already nearly completely exhausted raw material, for the second step—boiling at atmospheric pressure—the extract obtained under higher pressure, and for the first step—treatment at temperature below the boiling point of water—the extract obtained in the second step after it has been cooled to the lower temperature.

I employ for the second step preferably two extractors and for the first a series of at least five. The fresh bran is thus always treated first with the most concentrated extract contained in the battery and produced from the immediately preceding fresh bran by the next concentrated extract in the next following extractor, and the final extract thus obtained shows a concentration unobtainable in any other way.

In order to maintain in the series of extractors worked below the boiling point of water always the proper temperature, I employ preferably the well known calorizators usually attached to them in a battery of this kind for rewarming the extracting liquid while passing therethrough from one extractor to the next following one. As heating medium for these calorizators I employ with the greatest advantage the extract obtained in the last extractor of the series working at the boiling point of water, which extract is thus cooled to the required lower temperature before entering the first series.

In most cases the various extracts in the series of extractors worked at the lowest temperature contain a not inconsiderable amount of dissolved proteid matter which coagulates already at a temperature slightly above 70° C. and might thus be lost for the food product; under such circumstances I use in the calorizators as heating medium a liquid having no higher temperature than that indicated.

For treating wheatbran in the first series of extractors, I found the most favorable temperature to be 60° C. fluctuating in practice between 58 and 62° C.; the temperature of the mash and extracts must never be allowed to drop below 56° C., as already slightly below this temperature acids begin to form. At a still lower temperature a rapid formation of acids, mainly lactic acid, and a kind of putrid dissociation of the proteid matter takes place in the extract which makes the food products made therewith disliked by most people. This serious difficulty is completely overcome by my new process which—of course—is continuous.

When being extracted according to my new process forming the object of this invention, the diastatic ferments contained in the raw materials convert a very large, usually the greater portion of the starchy matter present into soluble products, maltose and dextrin; the considerable quantity of soluble proteid matter retains its original solubility; by far the larger portion of the valuable organic phosphates and other mineral matter are dissolved, and the raw materials yield practically the whole amount of their nutritious components, and that at very low costs so that these extracts become one of the best and cheapest articles of our diet.

I claim:—

1. The process of extracting from bran and similar products their nutritious components, which consists in treating the raw material with water as solvent in a continuously working battery of extractors in two series of the latter having fixed different temperatures, the contents of the first series, in which the fresh raw material is treated, being evenly maintained in each extractor at the temperature most favorable for the conversion of its starchy into sugary products by its diastatic elements and for preventing the coagulation of dissolved albuminous matter and any possible acidification, decomposition and putrefaction, which temperature always lies considerably below the boiling point of water, and the contents of the second series, in which the raw material exhausted in the said first series is treated, being maintained in each extractor at the boiling point of water, the hot watery extract obtained in the said second series being cooled to the lower temperature of the said first series on its passage to the latter.

2. The process of extracting from bran and similar products their nutritious components, which consists in treating the raw material with water as solvent in a continuously working battery of extractors connected with calorizators and divided into two series having fixed different temperatures, the contents of the said first series in which the fresh raw material is treated, being evenly maintained in each extractor at the temperature most favorable for obtaining the components recoverable thereat, and the contents of the said second series, in which the raw material exhausted in the said first series is treated, being maintained in each extractor at the boiling point of water, the hot watery extract obtained in the said second series being cooled on its passage to the said first series to the lower temperature of the latter by being used in the said calorizators for rewarming the naturally cooling watery extract of the said first series to the required degree while passing from one extractor to the next succeeding one of this series.

3. The process of extracting from bran and similar products their nutritious components, which consists in treating the raw material with water as solvent in a continuously working battery of extractors divided into two series of the latter, the contents of the first series, in which the fresh raw material is treated, being evenly maintained in each extractor at the temperature of approximately 60° C., and the contents of the second series, in which the raw material exhausted in the said first series is treated, being maintained at the boiling point of water in each extractor, but the last one of this series, under atmospheric pressure, and in the said last one, containing the now practically exhausted material, under a pressure of 1½ to 2 atmospheres, the hot watery extract obtained in the said second series being cooled to approximately 60° C. on its passage to the said first series.

4. The process of extracting from bran and similar products their nutritious components, which consists in treating the raw material with water as solvent in a continuously working battery of extractors connected with calorizators and divided into two series, the contents of the first series, in which the fresh raw material is treated, being evenly maintained in each extractor at the temperature of approximately 60° C., and the contents of the second series, in which the raw material exhausted in the said first series is treated, being maintained at the boiling point of water, the hot watery extract obtained in the said second series being cooled on its passage to the said first series, first to approximately 70° C. by means of a refrigerator, and then to approximately 60° C. by being used in the said calorizators for rewarming the naturally cooling watery extract of the said first series while passing from one extractor to the next succeeding one of this series.

LOUIS CHARLES REESE.